US012792818B2

(12) United States Patent
Majumdar et al.

(10) Patent No.: US 12,792,818 B2
(45) Date of Patent: Nov. 10, 2026

(54) ROBOTIC PROCESS AUTOMATION OF CONVERTING STANDARD OPERATING PROCEDURES TO AN INTELLIGENT FORMAT

(71) Applicant: Aveva Software, LLC, Lake Forest, CA (US)

(72) Inventors: Arijeet Majumdar, Lake Forest, CA (US); Keith Chambers, Lake Forest, CA (US); Vamshi Shankar M, Lake Forest, CA (US)

(73) Assignee: Aveva Software, LLC, Lake Forest, CA (US)

( * ) Notice: Subject to any disclaimer, the term of this patent is extended or adjusted under 35 U.S.C. 154(b) by 222 days.

(21) Appl. No.: 18/907,835

(22) Filed: Oct. 7, 2024

(65) Prior Publication Data

US 2025/0117568 A1 Apr. 10, 2025

Related U.S. Application Data

(60) Provisional application No. 63/589,179, filed on Oct. 10, 2023.

(51) Int. Cl.
*G06F 40/103* (2020.01)
*G06F 40/186* (2020.01)

(52) U.S. Cl.
CPC .......... *G06F 40/103* (2020.01); *G06F 40/186* (2020.01)

(58) Field of Classification Search
CPC ............................ G06F 40/103; G06F 40/186
See application file for complete search history.

(56) References Cited

U.S. PATENT DOCUMENTS

2002/0143727 A1* 10/2002 Hu ........................ G16H 30/20
2021/0124919 A1* 4/2021 Balakrishnan ....... B42D 25/309
2022/0277136 A1* 9/2022 Shekhar ................ G06F 18/211
2024/0369994 A1* 11/2024 Thuluva ........... G05B 19/41885
2025/0036851 A1* 1/2025 Nath ..................... G06F 40/103

* cited by examiner

*Primary Examiner* — Anil K Bhargava
(74) *Attorney, Agent, or Firm* — Dergosits & Noah LLP; Todd A. Noah

(57) ABSTRACT

A system extracts procedure content from a procedure in a source format in a source document. The system identifies, in the procedure content, first section content in a first section and second section content in a second section. The system identifies, in a template for the procedure, a primary section that corresponds to the first section in the source document, and a secondary section that corresponds to the second section in the source document, The system transforms the first section content from the source format into first transformed content in a target format for the primary section and the second section content from the source format into second transformed content in a target format for the secondary section. The system stores the first transformed content and the second transformed content as part of a standardized format procedure in a procedure repository, and provides user access to the standardized format procedure.

17 Claims, 8 Drawing Sheets

100

300

ROBOTIC PROCESS AUTOMATION OF CONVERTING STANDARD OPERATING PROCEDURES TO AN INTELLIGENT FORMAT

CROSS REFERENCE TO RELATED APPLICATION

This application claims priority to U.S. Provisional Patent Application No. 63/589,179 filed Oct. 10, 2023, the entire contents of which is incorporated herein by reference as if set forth in full herein.

BACKGROUND

Industrial facilities use tools such as standard operating procedures to direct specific workflows. Often, these procedures are created in different structural formats, such as a rows and columns format or a flowchart format, various application-based formats, such as an Excel® format or a Word® format, or a combined format, such as a Word® flowchart format. Currently, conversion of a procedure from one format to another format requires manual conversion. Consequently, industrial facilities that have thousands of different procedures in dozens of different formats could require a group of individuals to spend many years to complete the manual conversion of all procedures.

DETAILED DESCRIPTION

Figure 1:
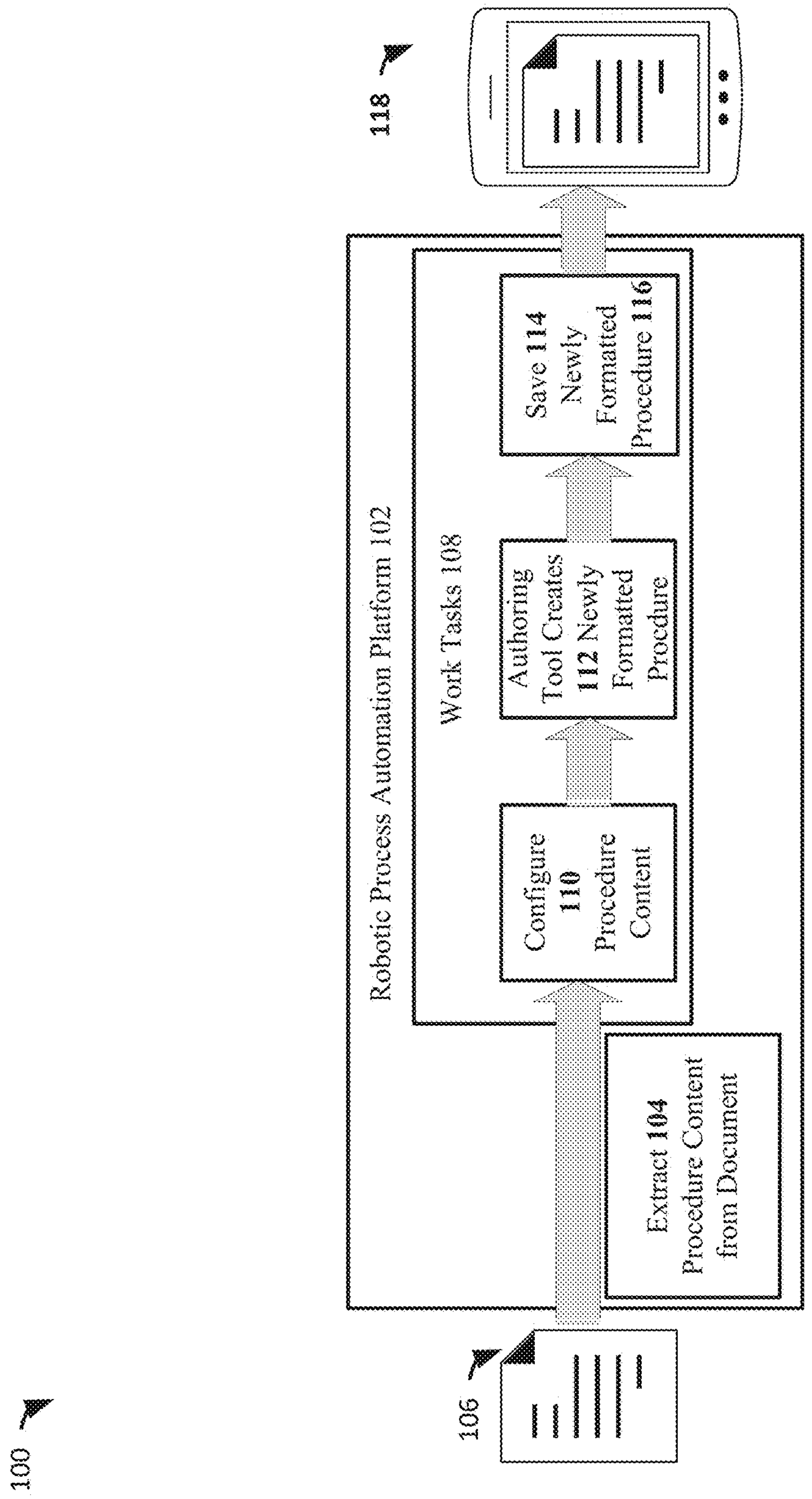
FIG. 1 illustrates example steps for robotic process automation of converting standard operating procedures to an intelligent format according to some embodiments.

There has been a long felt but unmet need for this intelligent procedure framework, as prior art systems require manual input of all procedures documents to be converted into an intelligent format. There may be tens of thousands of procedures documents associated with an industrial site, so it is not feasible to manually convert these procedures documents. By providing an intelligent procedure framework that is able to learn procedure document formatting and transfer reformatted information into correct corresponding sections in an intelligent format, valuable time and computer resources are conserved.

The disclosure is directed to systems and methods for robotic process automation of converting standard operating procedures to an intelligent format. Procedures may be recorded in paper or digital documents and cover topics such as operational, safety, maintenance, and/or turnaround procedures, with each document including a part of a procedure, a complete procedure, or any number of any combination of partial and/or complete procedures. For example, a document that lists a procedure for cleaning an industrial pump may also embed a procedure for disassembling the pump so that the pump can be cleaned. As used herein, any reference to a standard operating procedure, other procedure, and/or any other type of document is a reference to a procedure document in general and is interchangeable when defining the metes and bounds of the disclosed system. An intelligent procedure framework can integrate such procedures and then convert these procedures into an intelligent format, which may be chosen based on an end user's needs and/or selections.

The integration process uses robotic process automation, which is a form of business process automation that is based on software robots (or "bots") that use an automotive technology which follows a predefined workflow. In traditional workflow automation tools, a software developer uses an application's graphical user interface (GUI) to produce a list of actions to perform a task and interface to a back-end system using internal application programming interfaces (APIs) or dedicated scripting language. In contrast, a robotic process automation bot develops an action list by watching a user produce an action list using the application's graphical user interface, and then automates the performance of a similar task by repeating those user inputs directly in the graphical user interface. The robotic process automation bot can execute the commands on a graphical user interface through one or more icon selections and/or field populations on a graphical user interface, and generate a visualization of the executed commands. In this respect, the robotic process automation bot can create an intelligent procedure by mimicking a human manipulation of a graphical user interface.

The robotic process automation bot can learn to execute one or more automated procedures based on variations of an input command. The robotic process automation bot can store a series of commands executed by the user during a manual execution of a procedure. An example manual procedure may include retrieving a list of all open work orders, sorting open work orders by date, and filtering the open work orders by a specific name. This order of execution results in a manually formatted report. The robotic process automation bot can store an order of execution that includes icon selection, field population, and other various commands associated with the manipulation of a digital file.

The robotic process automation bot can analyze the manual executions and repeat the user inputs for the manual execution to produce a robotic formatted report that is formatted the same as the manually formatted report. The robotic process automation bot can repeat at least a portion of the manual execution to produce a robotic formatted report that is formatted the same as the manually formatted report. The robotic process automation bot can alter the manual procedure to produce the robotic formatted report with fewer and/or more efficient graphical user interface executions, thereby saving computer resources.

The intelligent procedure framework provides an efficient, accurate, and cost-effective conversion process utilizing the processing capabilities of industrial business process management and robotic process automation to convert papers and/or digital documents that were created in one or more different formats into an intelligent format. For example, if a typical industrial or manufacturing site has 5,000 procedures, and an employee spends an average of 10 hours to convert a procedure from its existing format to an intelligent format, which is one standardized format, then a total of 50,000 hours of manual labor would be required for the procedure conversions at each industrial site. A digital procedure builder solution that provides the ability to write industrial procedures in an environment that is similar to a Microsoft Word can execute the industrial procedures on mobile devices. The benefits from the intelligent procedure framework's trained robotic process automation bot can include accelerating the speed of the conversion process to conserve significant amounts of computer-related resources, while promoting sustainability and standardization.

In an embodiment, a system extracts procedure content from a procedure that is in a source format in a source document. The system identifies, in the procedure content, first section content in a first section and second section content in a second section. The system identifies, in a template corresponding to the procedure, a primary section that corresponds to the first section in the source document, and a secondary section that corresponds to the second section in the source document. The system transforms the first section content from the source format into first transformed content in a target format for the corresponding primary section and the second section content from the source format into second transformed content in a target format for the corresponding secondary section. The system stores the first transformed content and the second transformed content as part of a standardized format procedure in a procedure repository, and provides access for a user to the standardized format procedure.

For example, a robotic process automation bot extracts text, diagrams, data structures, and images from a standard operating procedure for feedwater pump maintenance that is in a Microsoft Word® flowchart. The robotic process automation bot identifies, in the extracted text, diagrams, data structures, and images, some Microsoft Word® text in the flowchart's written instructions section and some Microsoft Word® text in the flowchart's notes section. The robotic process automation bot identifies, in a template corresponding to a pump maintenance procedure in a PDF document, a written instruction section in a rows and columns format that corresponds to the written instructions section in the Microsoft Word® flowchart, and a notes section in a rows and columns format that corresponds to the notes section in the Microsoft Word® flowchart, even though the written instructions and notes are in different locations in the Microsoft Word® flowchart relative to their corresponding locations in PDF rows and columns. The robotic process automation bot transforms the written instructions from the Microsoft Word® flowchart into written instructions in PDF rows and columns and notes from the Microsoft Word® flowchart into notes in PDF rows and columns. The robotic process automation bot stores the written instructions and notes in PDF rows and columns in a standardized format procedure for feedwater pump maintenance in a PDF document, and provides authenticated operators who maintain feedwater pumps in industrial plants with quick and easy access to this standardized format PDF document that includes a rows and columns-based procedure for feedwater pump maintenance.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. Operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment may be included in at least one embodiment of the disclosure. The appearances of the phrase "an embodiment" or "the embodiment" in various places in the specification do not necessarily all refer to the same embodiment.

FIG. 1 depicts example steps for robotic process automation of converting standard operating procedures to an intelligent format according to some embodiments. The intelligent procedure framework can use a robotic process automation platform 102, such as an AVEVA™ WorkTasks™, to read and extract 104 procedure content contained in a procedure recorded in a paper or digital (spreadsheet, PDF, or word processor-based) document 106, and integrate this procedure content into a digital procedures application, such as AVEVA™ WorkTasks™ Pro App, which executes work tasks 108. The robotic process automation platform 102 can capture procedure content such as text instructions and images during an execution instance of the procedure in the document 106.

The robotic process automation platform 102 can execute the work tasks 108 to identify one or more steps, actions, and/or operator visual cues to be processed into an intelligent format procedure, then configure 110 or transform the procedure content that includes the identified steps, actions, and cues from their current format into an intelligent format for the procedure, and add the transformed steps, actions and cues to an authoring tool that creates 112 an intelligent format procedure. The robotic process automation platform 102 can save 114 or store the intelligent format procedure 116 to a procedure repository and/or library, and enable users to access the intelligent format procedure repository and/or library. Having received a procedure's step-by-step guidance in one format, the robotic process automation platform 102 can use the steps captured from the document to display and/or execute this guidance in another format via the intelligent format procedure 116 on one or more computers, such as a mobile device 118.

The intelligent procedure framework can include various combinations of business process management, robotic process automation, artificial intelligence, and machine learning technology that reduce the manual effort, cost, and time in converting physical and/or digital documents in various formatted standard operating procedures into documents in an intelligent format. The intelligent procedure framework can avoid duplication of procedure content and/or centralize machine/operational critical procedure content and make the content available in an intelligent format. This enables users to obtain accurate procedure content and/or authentic procedure content in any location. The intelligent procedure framework can typically yield 90% or better accuracy in procedure format conversions.

Figure 2:
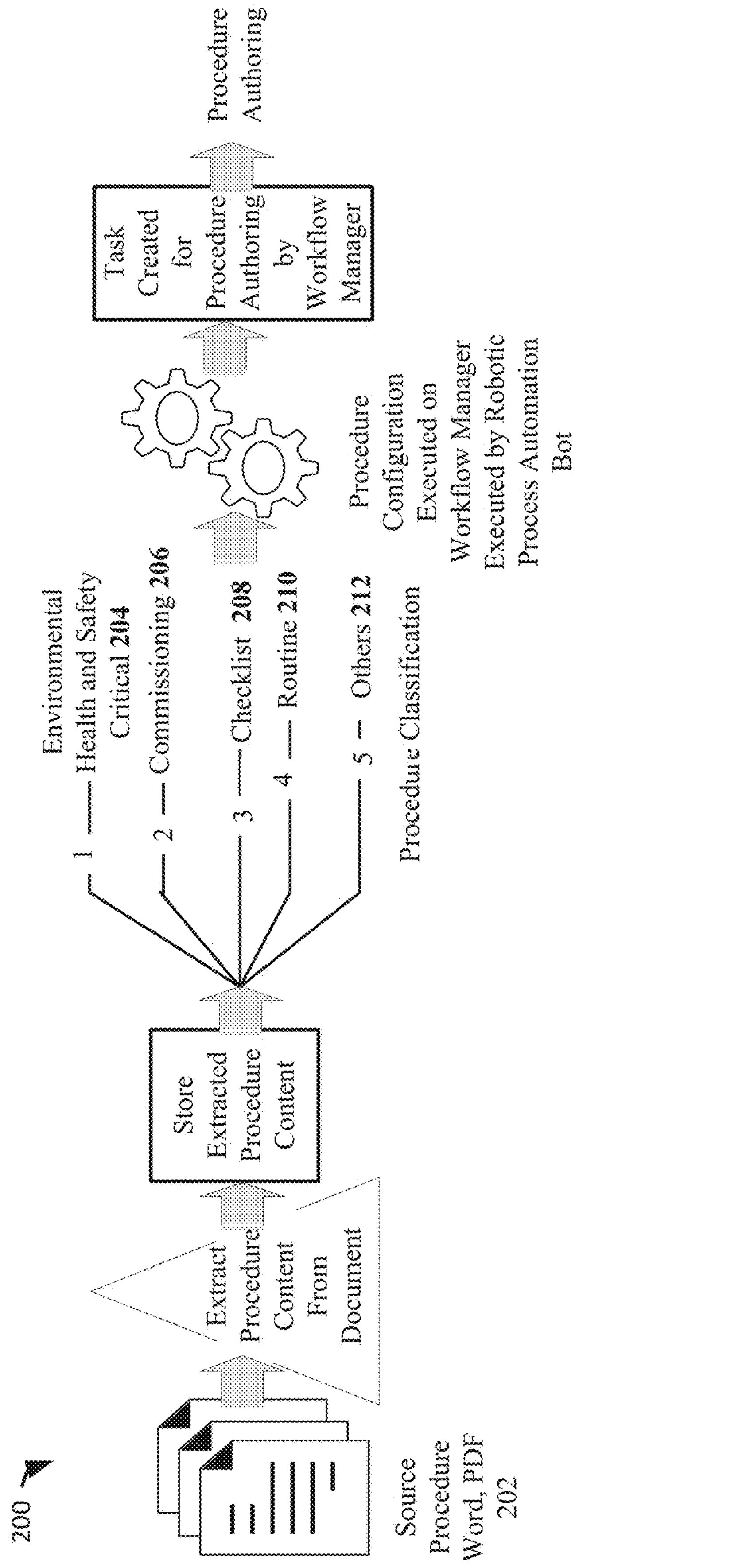
FIG. 2 illustrates a read and configuration process flow diagram for robotic process automation of converting standard operating procedures to an intelligent format according to some embodiments.

FIG. 2 depicts a read and configuration process flow diagram according to some embodiments. An intelligent procedure framework 200 includes a bot that executes on a robotic process automation platform and learns the sections of multiple formats for conversion into an intelligent format. When a user teaches the robotic process automation bot to recognize one or more sections of a procedure in a specific format, the robotic process automation bot has learned to identify one or more similar sections of another procedure in another format, based on text within both the one or more teaching sections and the one or more similar sections. For example, the intelligent procedure framework 200 receives one or more images which depict one of a training set's standard operating procedure that is laid out in a row and column format, where each column represents a section in the standard operating procedure, and each row represents a step in the standard operating procedure. In this example, the standard operating procedure includes a first column for a picture section, a second column for a written instruction section, a third column for a notes section, and a fourth column for a safety section.

The training set's standard operating procedure is uploaded to the robotic process automation platform after a user ensures that each section is labeled in the source and target documents. The robotic process automation bot can extract the procedure content from each source section in the source procedure 202, store the extracted procedure content, and classify the source procedure 202, such as the classifications for environmental health and safety critical 204, commissioning 206, checklist 208, routine 210, and others 212. Then the robotic process automation bot can configure or transform the source section's procedure content into a target format for each target section, and use each section's label to confirm the identification where to enter each source section's transformed procedure content into corresponding sections in an intelligent procedure. Next, the robotic process automation bot can create a task for procedure authoring by a workflow manager. For example, the labels confirm that the transformed content from the source's picture section should be entered in the target's image section.

Further to the example, the trained intelligent procedure framework 200 uploads a standard operating procedure that uses a flowchart format instead of the row and column format that had already been uploaded. The flowchart-based standard operating procedure also has a picture section, a written instruction section, a notes section, and a safety section, but in different locations than the row and column-based standard operating procedure. However, the trained intelligent procedure framework 200 can identify the correct designation for each section, and after transforming the procedure content for each section accordingly, transfer the transformed procedure content that originated from each source section to a correct corresponding target section in an intelligent procedure. The trained intelligent procedure framework 200 can use the procedure content in each section to identify an appropriate designation for the section. The intelligent procedure framework 200 includes a library that can store each learned intelligent procedure format.

Figure 3:
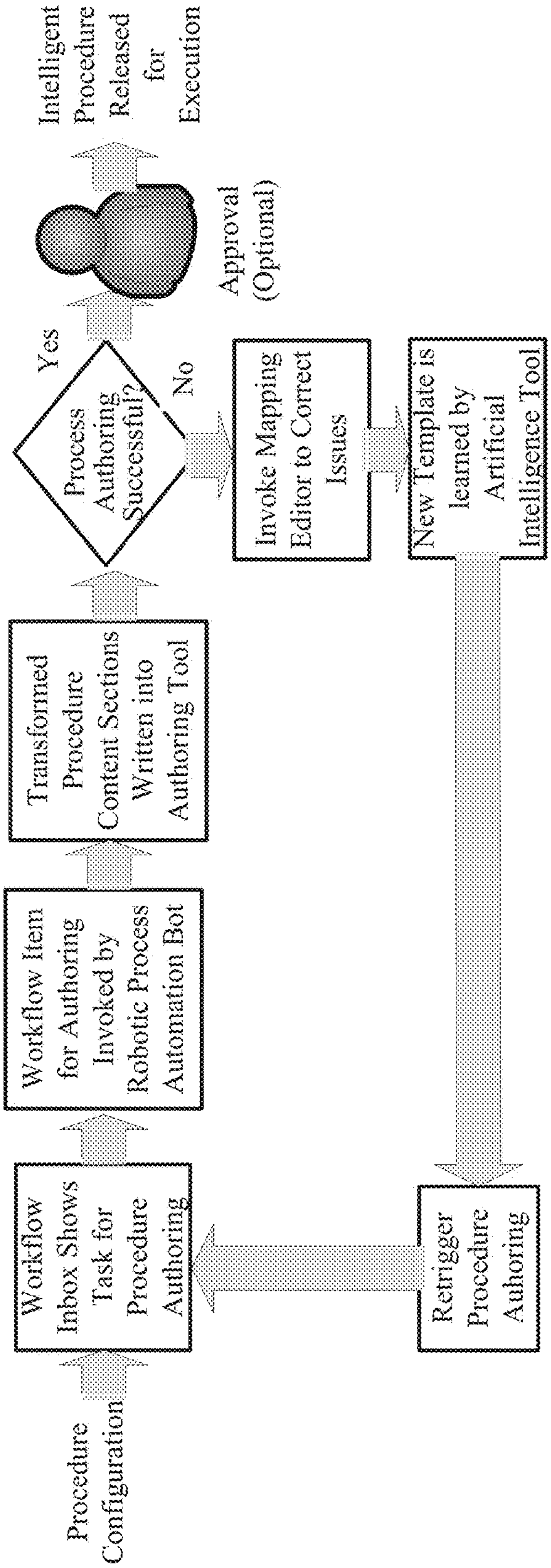
FIG. 3 depicts a procedure authoring process flow diagram for robotic process automation of converting standard operating procedures to an intelligent format according to some embodiments.

FIG. 3 illustrates a procedure authoring process flow diagram according to some embodiments. The workflow manager's inbox shows tasks for procedure authoring, and when a robotic process automation bot initiates a work item for authoring, the transformed procedure content sections are written into an authoring tool. If the process authoring was successful, and the intelligent procedure is approved, then the intelligent procedure may be released for execution.

The robotic process automation bot can execute learned conversions, formatting, and/or procedure executions as bases for converting procedures that have unfamiliar formats. The robotic process automation bot can convert at least a portion of unfamiliar formatted procedures that includes sections which are formatted similar to the formatting of procedures' sections already stored by the robotic process automation platform. As in the case of standard operating procedures, a majority of the procedure content of one or more of the unfamiliar procedure's sections uses words or phrases, such as headings and key words, that are similar to the words and phrases used by one or more intelligent procedure sections, such that the robotic process automation bot can recognize a specific section in a source procedure as corresponding to a particular intelligent section.

The robotic process automation bot can automatically convert sections deemed to have a high probability, such as a confidence of greater than 95%, of corresponding to a particular intelligent procedure section. The robotic process automation bot can enable a user to review and/or confirm the similar portions of the converted parts of the unfamiliar procedure. Even for source documents with seemingly drastic differences from previously recognized documents, the robotic process automation bot can successfully convert much of the procedure in the source document, such as 60%, to an intelligent procedure format.

After converting a procedure's sections that have familiar formatting, the robotic process automation bot can prompt a user for instructions on how to convert the remaining sections of the procedure with an unfamiliar format. The conversion of the remaining sections of a procedure with unfamiliar formats may have a confidence level that is less than a predetermined threshold, such as less than 95%. The prompt can include a location and/or content of one or more of the procedure's sections with an unfamiliar format, which may need further processing.

Training the robotic process automation bot on how to convert the remaining sections with an unfamiliar format can include physically selecting one or more sections and/or selecting one or more commands for the conversion in the graphical user interface. These commands can be stored in the command library. Once trained, the robotic process automation bot can repeat the conversion process for any unfamiliar formatted sections which are identified as similar to the previously unfamiliar formatted sections.

The robotic process automation bot can execute one or more programs to obtain information missing from sections, procedures, and/or documents and/or instructions on how to integrate sections and/or procedures of a document into the intelligent procedure framework. The robotic process automation bot can periodically or continuously improve the accuracy of procedure format conversion by incorporating the integration instructions in the conversion of procedures. The robotic process automation platform is a self-learning system.

During the process of converting procedures, the robotic process automation bot can produce an error list for one or more sections and/or a procedure that the bot does not understand, pause the process and alert a user, such as a system administrator. Then the robotic process automation bot can record the actions taken by the user in a library and subsequently automatically execute the same actions when a similar situation arises again. The robotic process automation bot can produce a list of errors, wherein a user's selection of an error from the list can generate a step, which corresponds to the action taken to correct the error, in the conversion of a procedure, instead of the current user having to remember or research the specific detailed actions to take and then manually manipulate one or more inputs and/or icons in the graphical user interface.

Figure 4:
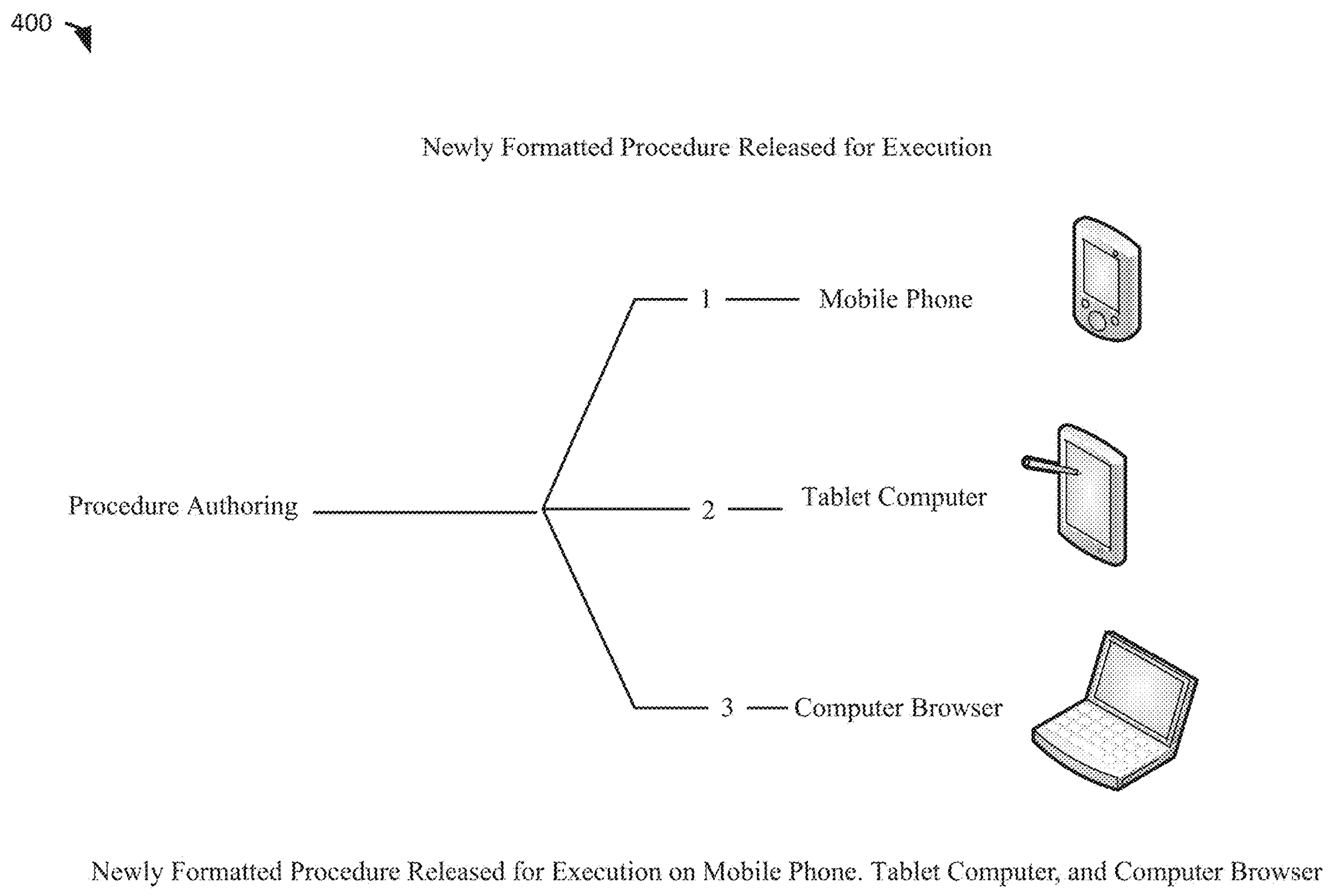
FIG. 4 depicts a process flow diagram for digital procedure release for robotic process automation of converting standard operating procedures to an intelligent format according to some embodiments.

FIG. 4 shows a process flow diagram for digital procedure release according to some embodiments. The robotic process automation platform can release a version of the intelligent procedure, which is slightly adjusted based on the size of the graphical user interface of the device receiving the intelligent procedure, such as the display screens of a mobile phone, a tablet computer, and a laptop browser.

Figure 5:
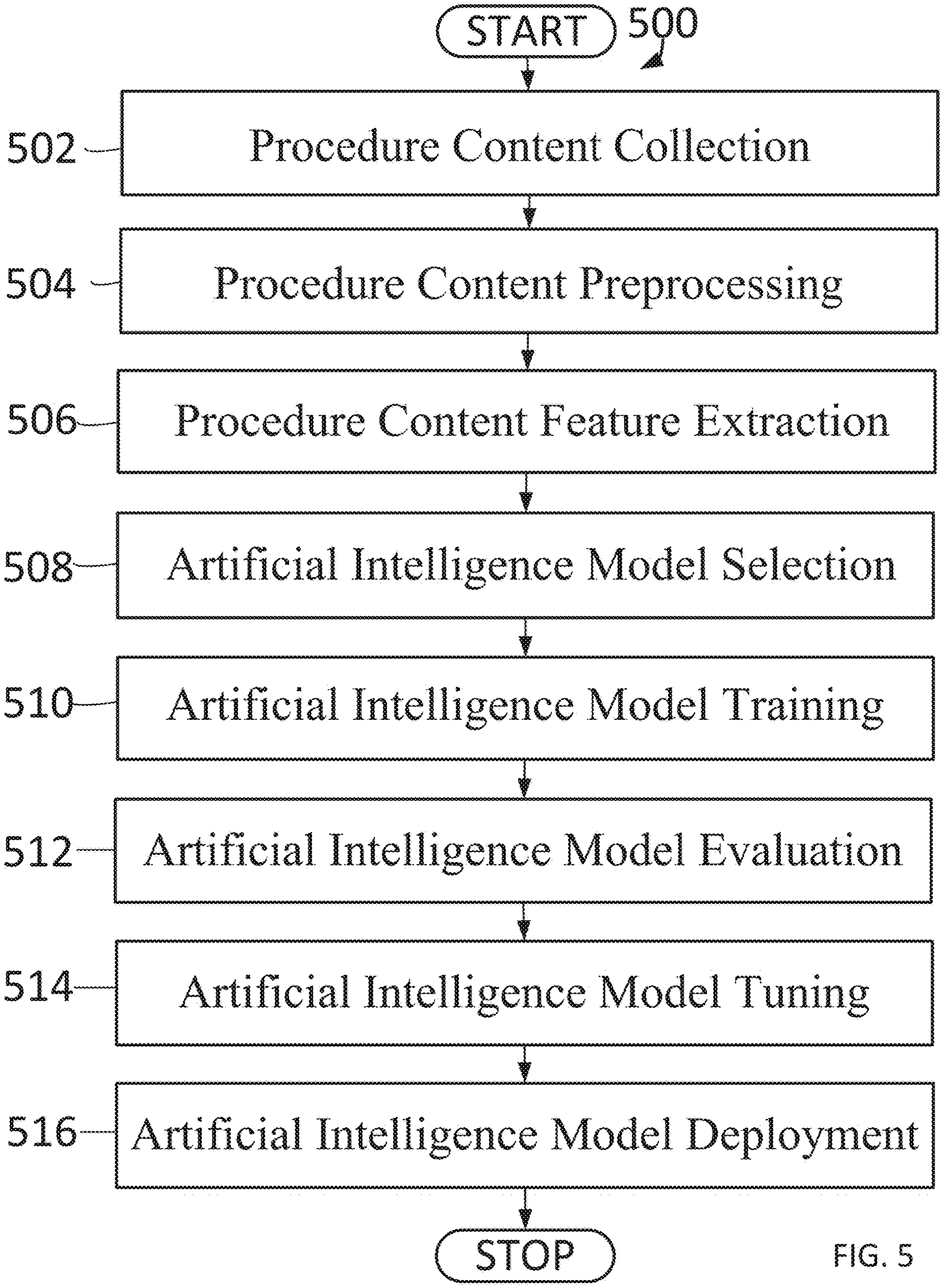
FIG. 5 depicts steps for training an artificial intelligence model for robotic process automation of converting standard operating procedures to an intelligent format according to some embodiments.

The selected commands, the integrated instructions, and the error lists may be used to improve conversions and the conversion confidence on future sections and/or procedures that have unfamiliar formats. The intelligent procedure framework can also train an artificial intelligence model to improve procedure conversions. The artificial intelligence model may be used to improve the identification of sections and/or procedures that have unfamiliar formats, thereby improving the confidence level for converting unfamiliar formatted sections and/or procedures. Training an artificial intelligence model includes procedure content collection, procedure content preprocessing, feature extraction, artificial intelligence model selection, artificial intelligence model training, artificial intelligence model evaluation, artificial intelligence model tuning, and/or deployment. FIG. 5 depicts example steps for training an artificial intelligence model according to some embodiments.

The intelligent procedure framework can use the formatted procedure content stored in the library and/or optical character recognition conversions of the text in source documents for at least part of the procedure content collection step, the procedure content preprocessing step, and/or the feature extraction step, which identifies and extracts parameters used in the procedure content. The artificial intelligence model selection is based on the particular application. The artificial intelligence model evaluation may be performed by witnessing and/or reviewing the intelligent procedure framework execution of the robotic process automation bot. The intelligent procedure framework can enable a user to correct and/or provide feedback corrections to the artificial intelligence model regarding assignments of sections that have unfamiliar formats to the intelligent format sections. The intelligent procedure framework can use the result of the execution of the robotic process automation bot as a training set for the artificial intelligence model.

This creates a continuous training loop for the artificial intelligence model, which learns to classify document subject matter based on both content and structure. This training is used to generate the confidence level for the robotic process automation bot, which attempts to further reduce the need for human intervention. However, the artificial intelligence model may only be used for assigning the sections that have unfamiliar formats to the existing intelligent procedure sections. While an artificial intelligence model is a powerful tool, it is also computationally intensive, and requires much greater computer resources than the robotic process automation bot requires, so using an artificial intelligence model to perform all conversion actions may not be the best choice for all applications. By limiting the use of artificial intelligence model to identifying and assigning sections that have unfamiliar formats, which the robotic process automation bot did not understand or found to be unfamiliar, precious computer resources are saved.

An advantage to the intelligent format includes automated updating. The robotic process automation bot can accept a change to one procedure in one document, and apply the same change and/or a similar change to one or more other procedures in one or more other documents automatically in a cascade operation. An example of this cascade operation may be the result of instructions for interacting with people during a pandemic. If such a situation requires an additional step, such as a person putting on a mask that covers their mouth and nose, the procedural step may be applied to one or more documents automatically using the robotic process automation bot after the robotic process automation bot is trained on the first document.

In another example, the robotic process automation bot can update one or more converted procedures in one or more documents if misclassifications by the artificial intelligence model and/or the robotic process automation bot are identified. By correcting one procedure in one document, the robotic process automation bot can learn and/or apply the correction to all relevant procedures in all relevant documents. The success rate of altering a converted procedure is very high since all procedures are in the same intelligent format and/or multiple pre-formatted templates.

The robotic process automation platform can generate a report, such as an audit, of one or more procedures converted to an intelligent format and subsequently executed. Such a report can include the number of steps completed, the length of time for a step and/or procedure competition, verification compliance, notes for review, who performed the work, and any escalation history. The robotic process automation platform can store copies of each procedure for review and/or auditing purposes. The report can include comparison of one or more parameters (time to completion, escalation, downtime, etc.) at one or more steps between team members, shifts, sites, etc. for historical and/or open procedures. A report can include a due date for a review of a procedure.

The execution of any conversion automated by the robotic process automation bot may be displayed on a graphical user interface. Such displayed activity may include such actions as mouse movements and dropdown selections, as well as any conventional computer interactions. The intelligent procedure framework can display an intelligent formatted procedure on any device.

The intelligent procedure framework can provide a graphical user interface which enables a user to create a new standard operating procedure in a new document. The graphical user interface enables the same inputs as controlled by the robotic process automation platform during procedure conversion. The newly formatted intelligent procedure may be added to the repository or library, and may be output in any format, as previously described. The graphical user interface can display one step in a procedure at a time and can prevent the display of the next step until the previous step is confirmed.

The intelligent format may be a single format into which all procedure conversions are transformed. However, the robotic process automation bot can convert an intelligent format into a user specific format. For example, if a user wishes to have all procedures in Word® format (or Excel®, PDF, etc.), the robotic process automation bot can accept a labeled user-specific format, and then output one or more intelligent procedures in the user-specific format.

Figure 6:
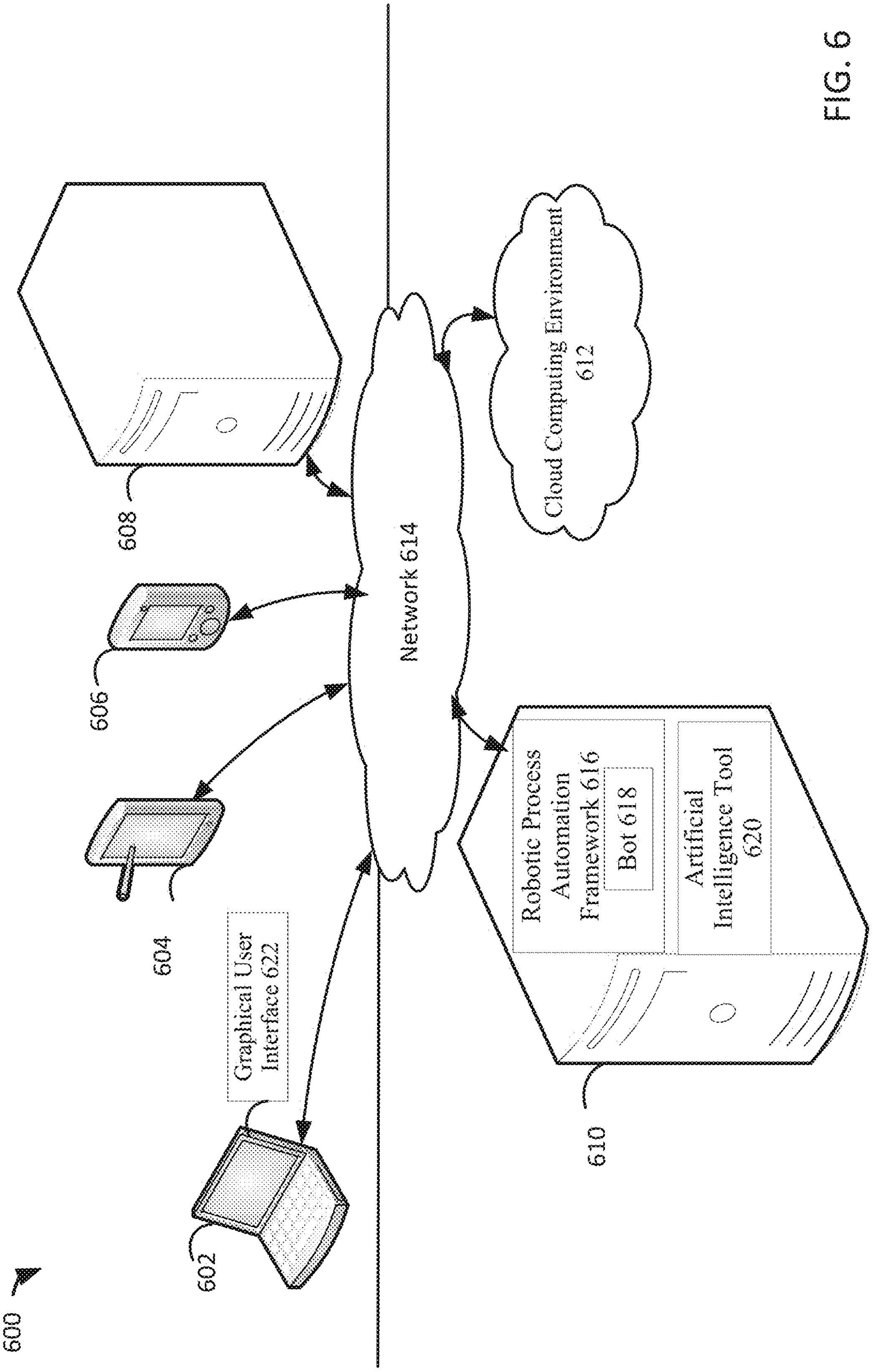
FIG. 6 illustrates a block diagram of an example system for robotic process automation of converting standard operating procedures to an intelligent format according to some embodiments.

FIG. 6 illustrates a block diagram of an example system 600 for robotic process automation of converting standard operating procedures to an intelligent format, under an embodiment. As shown in FIG. 6, the system 600 may illustrate a cloud computing environment in which data, applications, services, and other resources are stored and delivered through shared data centers and appear as a single point of access for the users. The system 600 may also represent any other type of distributed computer network environment in which servers control the storage and distribution of resources and services for different client users.

In an embodiment, the system 600 represents a cloud computing system that includes a first client 602, a second client 604, a third client 606, a fourth client 608, and a server 610 and an optional cloud computing environment 612 that may be provided by a hosting company. The clients 602-608, the server 610, and the cloud computing environment 612 communicate via a network 614. Even though FIG. 6 depicts the first client 602 as a laptop computer 602, the second client 604 as a tablet computer 604, the third client 606 as a smart phone 606, and the fourth client 608 as a server, each of the system components 602-610 may be any type of computer system, and may each be substantially similar to the hardware device 800 depicted in FIG. 8 and described below.

The server 610 can host a robotic process automation platform 616, which supports the execution of a robotic process automation bot 618. The server 610 can also host and execute an artificial intelligence model 620, which along with the bot 618, can communicate with a user via a graphic user interface 622, which can reside on any of the clients 602-608. Although FIG. 6 depicts all of the system elements 616-620 residing completely on the server 610, any or all of the system elements 616-620 may reside completely on the clients 602-608, completely on the cloud computing environment 612, or in any combination of partially on the clients 602-608, partially the server 610, partially on the cloud computing environment 612 and/or partially on another server which is not depicted in FIG. 6. FIG. 6 depicts the system 600 with four clients 602-608, one server 610, one cloud computing environment 612, one network 614, one set of system elements 616-620, and one graphical user interface 622, but the system 600 may include any number of clients 602-608, any number of server 610, any number of cloud computing environment 612, any number of network 614, any number of system elements 616-620, and any number of graphical user interface 622.

Figure 7:
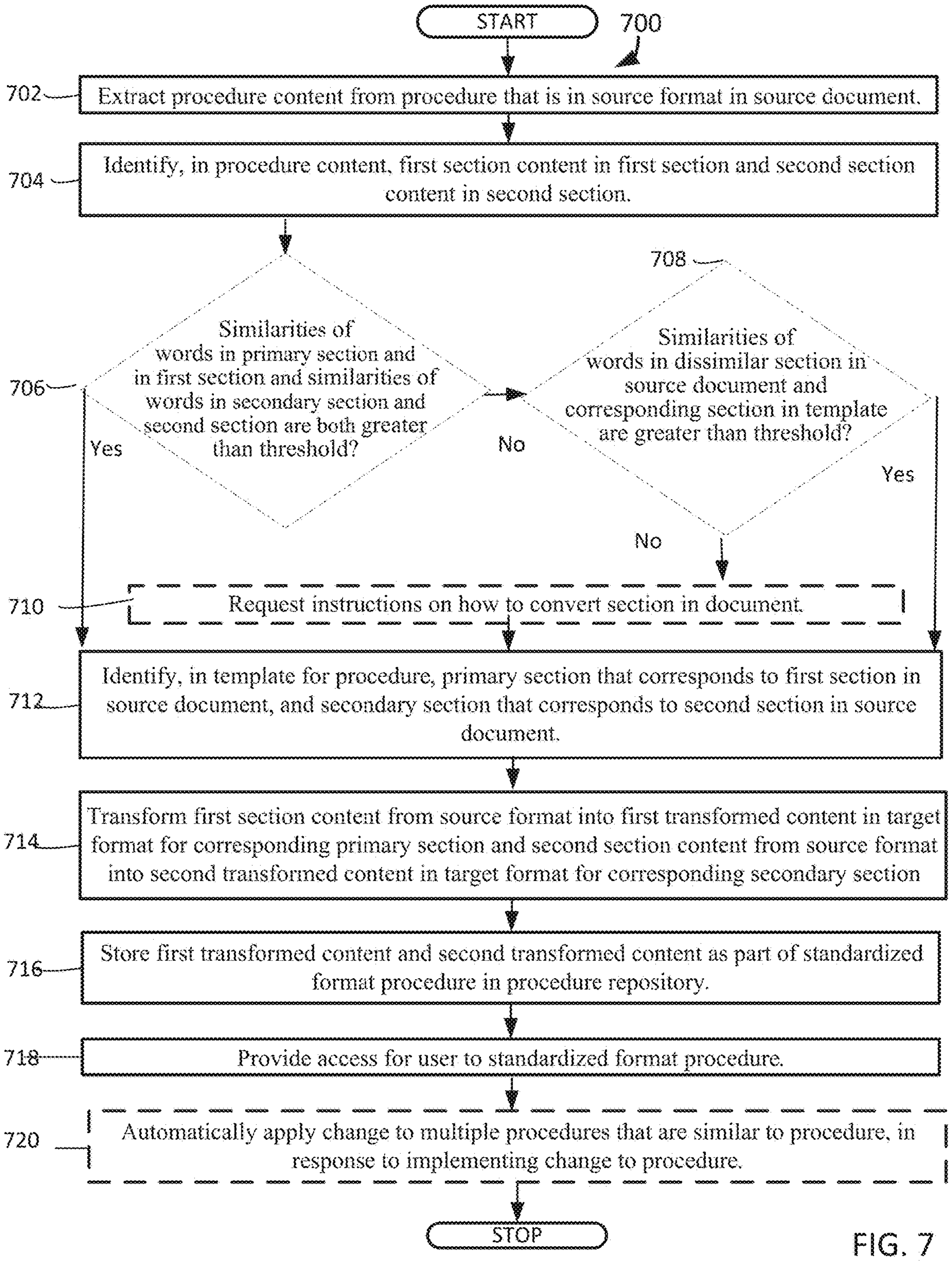
FIG. 7 illustrates an example flowchart of a computer-implemented method for robotic process automation of converting standard operating procedures to an intelligent format according to some embodiments.

FIG. 7 is a flowchart that illustrates a computer-implemented method for robotic process automation of converting standard operating procedures to an intelligent format, under an embodiment. Flowchart 700 depicts method acts illustrated as flowchart blocks for certain actions involved in and/or between the system elements 602-622 of FIG. 6.

Procedure content is extracted from a procedure that is in a source format in a source document, block 702. The system extracts content from procedures which were formatted by various formats. For example, and without limitation, this can include the robotic process automation bot 618 extracting text, diagrams, data structures, and images from a standard operating procedure for feedwater pump maintenance that is in a Microsoft Word @flowchart stored in a source document.

A procedure can be a series of actions conducted in a certain order or manner. Procedure content can be various information available about a series of actions conducted in a certain order or manner. A source can be a place or thing from which something comes or can be obtained. A source format can be the way in which something is arranged or set out at a place or thing from which something comes or can be obtained. A document can be a piece of written, printed, or electronic matter that provides information.

Extracting the procedure content may occur during an execution of an instance of the procedure. For example, the robotic process automation bot 618 extracts the procedure content from the feedwater pump maintenance procedure in a Microsoft Word® flowchart while an industrial plant operator is executing the procedure. An execution can be the performance of an instruction or a program. An instance can be an example or single occurrence of something.

After extracting procedure content, an identification is made, in the procedure content, of first section content in a first section and second section content in a second section, block 704. The system identifies sections of content in a procedure. By way of example and without limitation, this can include the robotic process automation bot 618 identifying, in the extracted text, diagrams, data structures, and images, some Microsoft Word® text in the flowchart's written instructions section and some Microsoft Word® text in the flowchart's notes section. A section can be any of the more or less distinct parts into which something is or may be divided or from which it is made up. Section content can be various information made available in any of the more or less distinct parts into which something is or may be divided or from which it is made up.

Following the identification of section content in sections, a determination is optionally made whether similarities of words in a primary section in a template and in the first section in the source document and similarities of words in the secondary section in the template and the second section in the source document are both greater than a threshold, block 706. The system determines which source sections are similar enough to target sections to be mapped to the target sections. In embodiments, this can include the robotic process automation bot 618 determining whether similarities of words in a written instructions section in a template for PDF rows and columns and in the written instructions section in the Microsoft Word® flowchart and similarities of words in the notes section in the template for PDF rows and columns and the notes section in the source document are both greater than a confidence threshold of 0.95.

A similarity can be the state or degree of resemblance. A word can be a single distinct meaningful element of speech or writing. A threshold can be the magnitude or intensity that must be exceeded for a certain reaction, phenomenon, result, or condition to occur or be manifest. A template can be a preset format for a document or file, used so that the format does not have to be recreated each time it is used.

If both of the similarities are not greater than the threshold, then the flowchart 700 continues to block 708 to spend additional computer resources on executing an artificial intelligence model to reevaluate whether the similarities are actually greater than the threshold. If both of the similarities are greater than the threshold, then the flowchart 700 proceeds to block 712 to map between the different document's matching sections.

Either of the first section in the procedure content and the primary section in the template or the second section in the procedure content and the secondary section in the template may be a section that is associated with activities, confirmations, definitions, images, notes, pictures, safety, task groups, or written instructions. For example, the feedwater pump maintenance procedure in a Microsoft Word® flowchart includes sections for written instructions, notes, pictures, and safety.

An activity can be an action taken to achieve an aim. A confirmation can be the action of verifying something. A definition can be a statement of the exact meaning of a word or a phrase. An image can be a representation of the external form of a thing. A note can be a brief record of facts, topics, or thoughts, written down as an aid to memory.

A picture can be an image. Safety can be the condition of being protected from or unlikely to cause danger, risk, or injury. A task group can be a collection of actions specially organized for an operation. A written instruction can be a textual representation of detailed information about how something should be done, operated, or assembled.

If both of the similarities are not greater than the threshold, then an artificial intelligence model is optionally used to determine whether similarities of words in a dissimilar section, comprising one of the first section or the second section, in the source document and a corresponding section in the template are greater than the threshold, block 708. The system can use artificial intelligence to verify whether a source procedure's sections are actually dissimilar from the existing procedure's sections. For example, and without limitation, this can include an artificial intelligence model determining whether similarities of words in the written instructions section in the template for PDF rows and columns and in the written instructions section in the Microsoft Word® flowchart and similarities of words in the notes section in the template for PDF rows and columns and the notes section in the source document are both greater than a confidence threshold of 0.95. The artificial intelligence model may make this reevaluation because the robotic process automation bot spent very limited computer resources determining that both of the similarities are not greater than the threshold.

Since the robotic process automation bot determined that both of the similarities were not greater than the threshold, either the first section or the second section or both the first section and the second section may have been preliminarily determined to be a dissimilar section for mapping purposes. Therefore, the artificial intelligence model will reevaluate either or both of the source sections as a preliminarily determined dissimilar section. While this simple example describes only two sections in the source document, there may be any number of sections in the source document, and the robotic process automation bot would determine whether every one of the sections had sufficient word similarities to surpass the confidence threshold and be mapped to one of the intelligent procedure sections in the template. Similarly, the artificial intelligence model would continue to conserve computer resources by only reevaluating the source sections which the robotic process automation bot had preliminarily determined to be a dissimilar section.

If the similarities of words in the dissimilar section in the source document and the corresponding section in the template are not greater than the threshold, then instructions are optionally requested on how to convert the dissimilar section, block 710. The system requests instructions how to convert procedure sections that are not similar to existing procedure sections. By way of example and without limitation, this can include the robotic process automation bot 618 requesting instructions on how to convert the dissimilar section in the Microsoft Word® flowchart procedure. An instruction can be detailed information about how something should be done, operated, or assembled. After the robotic process automation bot 618 receives the instructions on how to convert the dissimilar section, and implements these instructions, the sections in the source document and the template are ready to be mapped.

If the similarities of words in the primary section in the template and in the first section in the source document and the similarities of words in the secondary section in the template and the second section in the source document are both greater than a threshold, then an identification is made, in the template, of a primary section that corresponds to the first section in the source document, and of a secondary section that corresponds to the second section in the source document, block 712. The system maps source procedure sections to similar target procedure sections. In embodiments, this can include the robotic process automation bot 618 identifying, in a template corresponding to a pump maintenance procedure in a PDF document, a written instruction section in a row and column format that corresponds to the written instructions section in the Microsoft Word® flowchart, and a notes section in a row and column format that corresponds to the notes section in the Microsoft Word® flowchart, even though the written instructions and notes are in different locations in the Microsoft Word® flowchart relative to their corresponding locations in PDF rows and columns.

Alternatively, an identification may be made, in a template for the procedure, of the primary section that corresponds to the first section in the source document, and of the secondary section that corresponds to the second section in the source document, in response to a determination by the artificial intelligence model that the similarities of words in the dissimilar section in the source document and the corresponding section in the template are actually greater than the threshold. If the robotic process automation bot 618 did not initially identify the mapping between sections in the source document and the template, the artificial intelligence model through the spending of additional computer resources, may have been able to identify the correct mapping between sections in the source document and the template.

Having mapped between the different procedures' sections, the first section content is transformed from the source format into first transformed content in a target format for the corresponding primary section and the second section content is transformed from the source format into second transformed content in a target format for the corresponding secondary section, block 714. The system transforms the format of the source sections' content into the format of the target section's contents. For example, and without limitation, this can include the robotic process automation bot 618 transforming the written instructions from the Microsoft Word® flowchart into written instructions in PDF rows and columns and notes from the Microsoft Word® flowchart into notes in PDF rows and columns.

Transformed content can be information that has undergone a thorough or dramatic change in structure, appearance, or character. A target format can be the way in which something is arranged or set out at a place toward which efforts are directed. The target format is described separately for each of the sections of the template because the target format may be the same for all the transformation of procedure content from the source document, but in some instances the target format may differ. For example, a different type of formatting may be applied to the text in the procedure content for the written instructions section or the notes section than the type of formatting applied to visual images in the procedure content for the pictures section.

After transforming the format of the sections' content, the first transformed content and the second transformed content are stored as part of a standardized format procedure in a procedure repository, block 716. The system saves the newly formatted procedure. By way of example and without limitation, this can include the robotic process automation bot 618 storing the written instructions and notes in PDF rows and columns in a standardized format procedure for feedwater pump maintenance in a PDF document.

A part can be a piece or segment of something such as an object, which combined with other pieces makes up the whole. A standardized format procedure can be a series of actions conducted in a certain order or manner that is made uniform or consistent in the way in which the series of actions is arranged or set out. A procedure repository can be a central location which stores and manages data for a series of actions conducted in a certain order or manner.

Following the storing of the standardized format procedure in a procedure repository, a user is provided access to the standardized format procedure, block 718. The system enables users to access the standardized format procedures. In embodiments, this can include the intelligent procedure framework providing authenticated operators who maintain feedwater pumps in industrial plants with quick and easy access to this standardized format PDF document that includes a rows and columns procedure for feedwater pump maintenance.

Having stored and provided access to a standardized format procedure, a change may be automatically applied to multiple procedures that are similar to the standardized format procedure, in response to implementing the change to the procedure and/or the standardized format procedure, block 720. The system can cascade a change to one procedure to similar procedures. For example, and without limitation, this can include the robotic process automation bot 618 automatically applying a change to multiple procedures that are similar to standardized format PDF document that includes a rows and columns procedure for feedwater pump maintenance, in response to implementing the change to standardized format PDF document that includes a rows and columns procedure for feedwater pump maintenance.

Although FIG. 7 depicts the blocks 702-720 occurring in a specific order, the blocks 702-720 can occur in another order. In other implementations, each of the blocks 702-720 can also be executed in combination with other blocks and/or some blocks may be divided into a different set of blocks.

Figure 8:
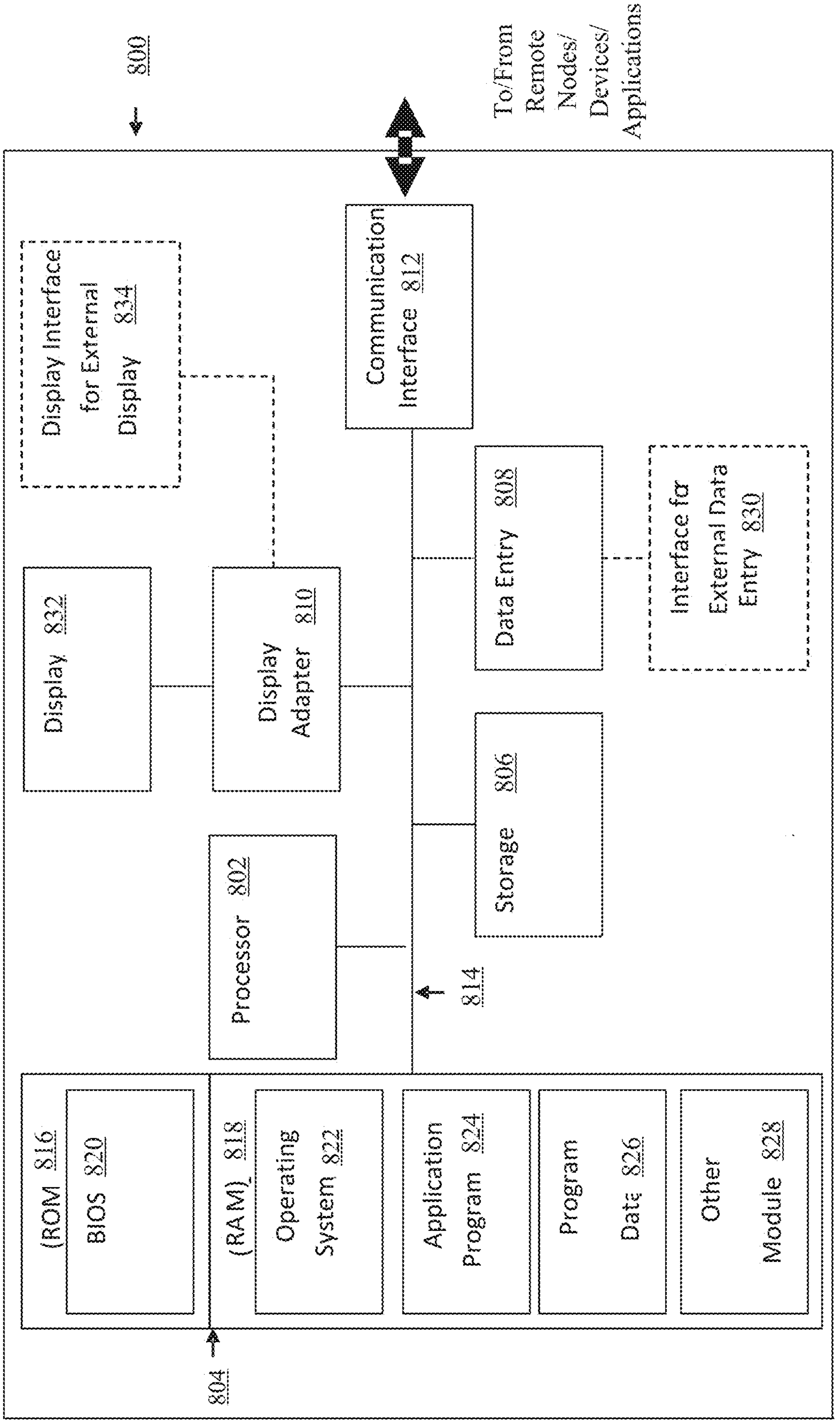
FIG. 8 is a block diagram illustrating an example hardware device in which the subject matter may be implemented.

An exemplary hardware device in which the subject matter may be implemented shall be described. Those of ordinary skill in the art will appreciate that the elements illustrated in FIG. 8 can vary depending on the system implementation. With reference to FIG. 8, an exemplary system for implementing the subject matter disclosed herein includes a hardware device 800, including a processing unit 802, a memory 804, a storage 806, a data entry module 808, a display adapter 810, a communication interface 812, and a bus 814 that couples elements 804-812 to the processing unit 802.

The bus 814 can comprise any type of bus architecture. Examples include a memory bus, a peripheral bus, a local bus, etc. The processing unit 802 is an instruction execution machine, apparatus, or device and can comprise a microprocessor, a digital signal processor, a graphics processing unit, an application specific integrated circuit (ASIC), a field programmable gate array (FPGA), etc. The processing unit 802 may be configured to execute program instructions stored in the memory 804 and/or the storage 806 and/or received via the data entry module 808.

The memory 804 can include a read only memory (ROM) 816 and a random-access memory (RAM) 818. The memory 804 may be configured to store program instructions and data during operation of the hardware device 800. In various embodiments, the memory 804 can include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

The memory 804 can also include nonvolatile memory technologies such as nonvolatile flash RAM (NVRAM) or ROM. It is contemplated that the memory 804 can include a combination of technologies such as the foregoing, as well as other technologies not specifically mentioned. When the subject matter is implemented in a computer system, a basic input/output system (BIOS) 820, containing the basic routines that help to transfer information between elements within the computer system, such as during start-up, is stored in the ROM 816.

The storage 806 can include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 800.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like can also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 806, the ROM 816 or the RAM 818, including an operating system 822, one or more applications programs 826, program data 826, and other program modules 828. A user can enter commands and information into the hardware device 800 through data entry module 808. The data entry module 808 can include mechanisms such as a keyboard, a touch screen, a pointing device, etc.

Other external input devices (not shown) are connected to the hardware device 800 via an external data entry interface 810. By way of example and not limitation, external input devices can include a microphone, joystick, game pad, satellite dish, scanner, or the like. External input devices can include video or audio input devices such as a video camera, a still camera, etc. The data entry module 808 may be configured to receive input from one or more users of the hardware device 800 and to deliver such input to the processing unit 802 and/or the memory 804 via the bus 814.

A display 812 is also connected to the bus 814 via the display adapter 810. The display 812 may be configured to display output of the hardware device 800 to one or more users. In some embodiments, a given device such as a touch screen, for example, can function as both the data entry module 808 and the display 812. External display devices can also be connected to the bus 814 via the external display interface 834. Other peripheral output devices, not shown, such as speakers and printers, may be connected to the hardware device 800.

The hardware device 800 can operate in a networked environment using logical connections to one or more remote nodes (not shown) via the communication interface 812. The remote node may be another computer, a server, a router, a peer device or other common network node, and typically includes many or all of the elements described above relative to the hardware device 800. The communication interface 812 can interface with a wireless network and/or a wired network. Examples of wireless networks include, for example, a BLUETOOTH network, a wireless personal area network, a wireless 802. 21 local area network (LAN), and/or wireless telephony network (e.g., a cellular, PCS, or GSM network).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 812 can include logic configured to support direct memory access (DMA) transfers between the memory 804 and other devices.

In a networked environment, program modules depicted relative to the hardware device 800, or portions thereof, may be stored in a remote storage device, such as, for example, on a server. It will be appreciated that other hardware and/or software to establish a communications link between the hardware device 800 and other devices may be used.

It should be understood that the arrangement of the hardware device 800 illustrated in FIG. 8 is but one potential implementation and that other arrangements are feasible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 800.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 8.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the descriptions above, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in a context, it is not meant to be limiting as those of skill in the art will appreciate that various of the acts and operations described hereinafter can also be implemented in hardware.

To facilitate an understanding of the subject matter described above, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for robotic process automation of converting standard operating procedures to an intelligent format, the system comprising:

one or more processors; and a non-transitory computer readable medium storing a plurality of instructions, which when executed, cause the one or more processors to:

extract procedure content from a procedure that is in a source format in a source document;

identify, in the procedure content, first section content in a first section and second section content in a second section;

identify, in a template corresponding to the procedure, a primary section that corresponds to the first section in the source document, and a secondary section that corresponds to the second section in the source document;

transform the first section content from the source format into first transformed content in a target format for the corresponding primary section and the second section content from the source format into second transformed content in a target format for the corresponding secondary section;

store the first transformed content and the second transformed content as part of a standardized format procedure in a procedure repository;

implement a change to the standardized format procedure;

apply, automatically, the implemented change to multiple procedures that are similar to the standardized format procedure; and provide access for a user to the standardized format procedure.

2. The system of claim 1, wherein extracting the procedure content occurs during an execution of an instance of the procedure.

3. The system of claim 1, wherein one of the first section in the procedure content and the primary section in the template or the second section in the procedure content and the secondary section in the template comprises a section associated with at least one of activities, confirmations, definitions, images, notes, pictures, safety, task groups, or written instructions.

4. The system of claim 1, wherein identifying that the primary section in the template corresponds to the first section in the source document and the secondary section in the template corresponds to the second section in the source document is in response to a determination that similarities of words in the primary section and in the first section and similarities of words in the secondary section and the second section are both greater than a threshold.

5. The system of claim 4, wherein the plurality of instructions further causes the processor to use an artificial intelligence model to determine whether similarities of words in a dissimilar section, comprising one of the first section or the second section, in the source document and a corresponding section in the template are greater than the threshold, in response to a determination that the similarities of words in the primary section and in the first section and similarities of words in the secondary section and the second section are not both greater than the threshold.

6. The system of claim 5, wherein the plurality of instructions further causes the processor to request instructions on how to convert the dissimilar section in the source document, in response to a determination that the similarities of words in the dissimilar section in the source document and the corresponding section in the template are not greater than the threshold.

7. A computer-implemented method for robotic process automation of converting standard operating procedures to an intelligent format, the computer-implemented method comprising:

extracting procedure content from a procedure that is in a source format in a source document;

identifying, in the procedure content, first section content in a first section and second section content in a second section;

identifying, in an identified for the procedure, a primary section that corresponds to the first section in the source document, and a secondary section that corresponds to the second section in the source document;

transforming the first section content from the source format into first transformed content in a target format for the corresponding primary section and the second section content from the source format into second transformed content in a target format for the corresponding secondary section;

storing the first transformed content and the second transformed content as part of a standardized format procedure in a procedure repository;

implementing a change to the standardized format procedure;

applying, automatically, the implemented change to multiple procedures that are similar to the standardized format procedure; and providing access for a user to the standardized format procedure.

8. The computer-implemented method of claim 7, wherein extracting the procedure content occurs during an execution of an instance of the procedure.

9. The computer-implemented method of claim 7, wherein one of the first section in the procedure content and the primary section in the template or the second section in the procedure content and the secondary section in the template comprises a section associated with at least one of activities, confirmations, definitions, images, notes, pictures, safety, task groups, or written instructions.

10. The computer-implemented method of claim 7, wherein identifying that the primary section in the template corresponds to the first section in the source document and the secondary section in the template corresponds to the second section in the source document is in response to a determination that similarities of words in the primary section and in the first section and similarities of words in the secondary section and the second section are both greater than a threshold.

11. The computer-implemented method of claim 10, wherein the computer-implemented method further comprises using an artificial intelligence model to determine whether similarities of words in a dissimilar section, comprising one of the first section or the second section, in the source document and a corresponding section in the template are greater than the threshold, in response to a determination that the similarities of words in the primary section and in the first section and similarities of words in the secondary section and the second section are not both greater than the threshold.

12. The computer-implemented method of claim 11, wherein the computer-implemented method further comprises requesting request instructions on how to convert the dissimilar section in the source document, in response to a determination that the similarities of words in the dissimilar section in the source document and the corresponding section in the template are not greater than the threshold.

13. A computer program product, comprising a non-transitory computer-readable medium having a computer-readable program code embodied therein to be executed by one or more processors, the program code including instructions to:

extract procedure content from a procedure that is in a source format in a source document;

identify, in the procedure content, first section content in a first section and second section content in a second section;

identify, in a template corresponding to the procedure, a primary section that corresponds to the first section in the source document, and a secondary section that corresponds to the second section in the source document;

transform the first section content from the source format into first transformed content in a target format for the corresponding primary section and the second section content from the source format into second transformed content in a target format for the corresponding secondary section;

store the first transformed content and the second transformed content as part of a standardized format procedure in a procedure repository;

implement a change to the standardized format procedure;

apply, automatically, the implemented change to multiple procedures that are similar to the standardized format procedure; and provide access for a user to the standardized format procedure.

14. The computer program product of claim 13, wherein extracting the procedure content occurs during an execution of an instance of the procedure.

15. The computer program product of claim 13, wherein one of the first section in the procedure content and the primary section in the template or the second section in the procedure content and the secondary section in the template comprises a section associated with at least one of activities, confirmations, definitions, images, notes, pictures, safety, task groups, or written instructions.

16. The computer program product of claim 13, wherein identifying that the primary section in the template corresponds to the first section in the source document and the secondary section in the template corresponds to the second section in the source document is in response to a determination that similarities of words in the primary section and in the first section and similarities of words in the secondary section and the second section are both greater than a threshold.

17. The computer program product of claim 16, wherein the program code includes further instructions to:

use an artificial intelligence model to determine whether similarities of words in a dissimilar section, comprising one of the first section or the second section, in the source document and a corresponding section in the template are greater than the threshold, in response to a determination that the similarities of words in the primary section and in the first section and similarities of words in the secondary section and the second section are not both greater than the threshold; and request instructions on how to convert the dissimilar section in the source document, in response to a determination that the similarities of words in the dissimilar section in the source document and the corresponding section in the template are not greater than the threshold.

* * * * *